United States Patent [19]
Noda et al.

[11] Patent Number: 6,001,398
[45] Date of Patent: Dec. 14, 1999

[54] PROCESSED MEAT PRODUCT AND PROCESS FOR PREPARING SAME

[75] Inventors: Minoru Noda, Chiba; Fumio Noda, Motofuchu-machi; Tetsuya Sugino, Sakujimachi; Yoshito Sugino, Yatamachi; Mitsuo Takahashi, Tokyo, all of Japan

[73] Assignee: Sugiyo Co., Inc., Japan

[21] Appl. No.: 09/090,163

[22] Filed: Jun. 4, 1998

[30] Foreign Application Priority Data

Mar. 4, 1998 [JP] Japan .................................. 10-071446

[51] Int. Cl.⁶ ...................................................... A23L 1/317
[52] U.S. Cl. ............................ 426/59; 426/643; 426/644; 426/646
[58] Field of Search ............................. 426/59, 641, 643, 426/644, 646

[56] References Cited

U.S. PATENT DOCUMENTS

| | | | |
|---|---|---|---|
| 4,439,456 | 3/1984 | Kammuri et al. | 426/643 X |
| 4,579,741 | 4/1986 | Hanson et al. | 426/643 X |
| 4,806,378 | 2/1989 | Ueno et al. | 426/643 |
| 5,028,444 | 7/1991 | Yamamoto et al. | 426/643 X |
| 5,137,746 | 8/1992 | Kanayama et al. | 426/643 |
| 5,718,932 | 2/1998 | Nakao et al. | 426/643 X |

FOREIGN PATENT DOCUMENTS

| | | |
|---|---|---|
| 51-86163 | 7/1976 | Japan . |
| 53-142561 | 12/1978 | Japan . |
| 54-14174 | 6/1979 | Japan . |
| 6-113796 | 4/1994 | Japan . |
| 7-67587 | 3/1995 | Japan . |

*Primary Examiner*—Arthur L. Corbin
*Attorney, Agent, or Firm*—Banner & Witcoff, Ltd.

[57] ABSTRACT

An edible material made from fish, shellfish, crustacean, poultry or animal meat by adding to 100 parts by weight of said meat 1.0 to 6.0 parts by weight of ethanol and 0.2 to 1.0 part by weight of an alkaline substance and grinding the mixture in a vacuum below 100 torr. The material has a low fat and a high protein content, a high caloric value and a high quality and is soft to the touch in the mouth and less likely to be contaminated with microorganisms and suitable as a material for various kinds of processed food. A process for preparing the material is also described.

12 Claims, No Drawings

PROCESSED MEAT PRODUCT AND PROCESS FOR PREPARING SAME

BACKGROUND OF THE INVENTION

This invention relates to an edible material or "surimi" prepared from fish, shellfish, crustacean, poultry or animal meat, and a food product prepared from the edible material. This invention also relates to a process for preparing the edible material and the food product from the edible material.

Japanese Unexamined Pat. Publ. No. 51-86163 discloses a method of sterilizing fish meat by adding 1 to 6 parts by weight of ethanol to 100 parts by weight of fish meat to be processed. Japanese Unexamined Pat. Publ. No. 7-67587 discloses a protein food which is prepared by treating raw fish or shellfish meat, or poultry or animal meat with an alkaline solution, and which has a high capacity to retain water and ingredients to give the food characteristic taste and deliciousness. Japanese Unexamined Pat. Publ. No. 53-142561 discloses a method by which a proteolytic enzymatic substance is added to minced fish meat to produce a food which has a texture similar to natural fish meat and is less resistive to mastication than "kamaboko", a traditional Japanese food made from heat-coagulated fish meat paste, and which is superior in shape, flavor, taste, color and mouthfeel. Japanese Examined Pat.Publ. No. 54-14174 discloses a method of preparing fish meat "surimi", wherein minced fish meat, the pH value of which has been adjusted between 6.5 and 7.0 by addition of alkali, is treated with lipase to produce "surimi" deprived of fat which would otherwise cause oxidation and coloration of the product made of the "surimi", without the danger of decomposing the actomyosin contained in the fish meat and degradation of the elasticity of the product. Japanese Unexamined Pat. Publ. No. 6-113796 discloses an enzymatic agent which contains transglutaminase and alkaline earth metal salts of organic acids, and makes it possible to prepare from low grade "surimi" a food product which has improved quality and water-retaining capacity and plasticity even with an increased amount of water contained therein.

A typical process for preparing fish meat "surimi" includes a rinsing step in which those ingredients such as amino acids which give the meat characteristic flavor and taste, taurine which is believed to be useful in preventing geriatric diseases, EPA, DHA and other useful ingredients are lost. With respect to animal meat, on the other hand, there is a limit to the forms to which the meat can be processed. As people of advanced age increase in present-day society, there is an increasing demand for highly nutritious, high-protein processed fish meat, crustacean meat, or poultry or animal meat products of high grade which are free of contaminating microorganisms or bacteria, low in fat content, and soft and smooth to the touch in the mouth. The demand, however, has not been met by any of the foods prepared by the above-mentioned prior methods.

SUMMARY OF THE INVENTION

The present inventors have conducted various studies and experiments to meet the above-mentioned demand and prepare fish meat or animal meat "surimi" which has high pliability or flexibility, a high capacity to retain water and a high nutritive value, and is suitable as a raw material for various kinds of processed foods.

The experiments the inventors have conducted are as follows:

(1) The experiment conducted to test the effect of the degree of vacuum during processing on the product.

Six samples were prepared in the following manner: 100 parts by weight of minced salmon meat was mixed with 2 parts by weight of table salt, 5 parts by weight of sugar and 20 parts by weight of iced water, and the mixture was put into a food processor installed in a vacuum desiccator in which the degree of vacuum is adjustable. With the desiccator set to different degrees of vacuum at 10, 50, 100, 380 and 760 torr, respectively, the processor was operated for 5 minutes to prepare 6 samples of salmon meat "surimi" or paste. Each of the samples was put into a plurality of tubes and heated at 90° C. for 30 minutes to form heat-coagulated pieces of "kamaboko".

The breaking strength, compressive distance, jelly strength and water-releasing rate of the samples were measured. The breaking strength and compressive distance were measured with a rheometer manufactured by Fudo Kogyo Co., Ltd., Japan. The jelly strength was expressed by the product of the breaking strength multiplied by the compressive distance. For measurement of the water-releasing rate, the samples were centrifuged with an amount of moisture-absorbing material at 3000 rpm for 4 minutes, and the water-releasing rate was expressed by the rate of change in the weight of each of the samples before and after the centrifugation. The results of the measurement are given in Table 1.

TABLE 1

| Vacuum (torr) | Breaking strength (g) | Compressive distance (cm) | Jelly strength (g · cm) | Water-releasing rate (%) |
| --- | --- | --- | --- | --- |
| 10 | 100 | 0.68 | 68.0 | 3.9 |
| 50 | 98 | 0.68 | 66.0 | 4.8 |
| 100 | 95 | 0.67 | 63.7 | 6.5 |
| 380 | 85 | 0.65 | 55.3 | 9.1 |
| 760 | 80 | 0.65 | 52.0 | 10.1 |

The table shows that the degree of vacuum below 100 torr, particularly below 50 torr, improves the jelly strength and water-releasing rate.

(2) The experiment conducted to test the effect of vacuum and ethanol on the product.

Eight samples were prepared in the following manner: 100 parts by weight of minced salmon meat was mixed with 2 parts by weight of table salt, 5 parts by weight of sugar and 20 parts by weight of iced water, and the mixture was divided into eight parts or samples, to which 0 (zero), 1, 2, 4, 6 and 8 parts by weight of ethanol having a concentration of 98.7% were added, respectively. In the desiccator set to a vacuum of 50 torr, each of the samples was ground by the food processor for 5 minutes to prepare salmon meat "suirmi". Each of the eight samples was put into tubes and heated at 90° C. for 30 minutes to form heat-coagulated pieces of "kamaboko".

The breaking strength, compressive distance, jelly strength, and water-releasing rate of each of the samples were measured. In addition, the number of bacteria was measured after storage at 30° C. for two days. The results are shown in Table 2.

TABLE 2

| Ethanol (parts by weight) | Breaking strength (g) | Compressive distance (cm) | Jelly strength (g · cm) | Water-releasing rate (%) | Number of bacteria (per gram) |
| --- | --- | --- | --- | --- | --- |
| 0 | 98 | 0.68 | 66.6 | 5 | $7.5 \times 10^7$ |
| 1 | 99 | 0.68 | 67.3 | 5 | $4.0 \times 10^6$ |
| 2 | 102 | 0.72 | 73.4 | 4 | $5.1 \times 10^5$ |
| 4 | 105 | 0.70 | 73.5 | 4 | $1.2 \times 10^5$ |
| 6 | 99 | 0.68 | 67.3 | 5 | $6.5 \times 10^4$ |
| 8 | 95 | 0.61 | 58.0 | 7 | $3.0 \times 10^4$ |

As shown in the table, the addition of 1(one) to 6 parts by weight, preferably 2 to 4 parts by weight, of ethanol improves the jelly strength and reduces the number of bacteria.

(3) The experiment conducted to test the effect of ethanol and alkali on the product.

Five samples were prepared in the following manner: 100 by weight of minced salmon meat was mixed with 2 parts by weight of table salt, 5 parts by weight of sugar, 4 parts by weight of 98.7% ethanol and 20 parts by weight of iced water, and the mixture was divided into five parts, to which 0.40, 0.60 0.80, and 1.00 part by weight of sodium hydrogencarbonate were added respectively and mixed to produce five masses, each of which was put into the food processor installed in the vacuum desiccator set to a vacuum of 50 torr. The processor was then operated for 5 minutes to grind each of the masses to produce five samples (numbered 1 through 5) of salmon meat "surimi".

Each of the samples was then put into tubes and heated at 90° C. for 30 minutes to form heat-coagulated pieces of "kamaboko". The breaking strength, compressive distance, jelly strength, and water-releasing rate of the samples and the number of bacteria therein were measured. The results of the measurement are given in Table 3.

Table 3 also shows the physical properties of two control samples. Control No. 1 was prepared by mixing 100 parts by weight of minced salmon meat, 2 parts by weight of table salt, 5 parts by weight of sugar, 4 parts by weight of 98.7% ethanol and 20 parts by weight of iced water, and grinding the mixture for 5 minutes under a vacuum of 50 torr, and heating the ground mass or "surimi" to produce heat-coagulated pieces of "kamaboko". The "kamaboko" of Control No. 2 was made from a mass of "surimi" prepared in the same way as that of Control pt that the "surimi" contained no ethanol and was No. 1 except the atmospheric pressure.

TABLE 3

| | Breaking strength (g) | Compressive distance (cm) | Jelly strength (g · cm) | Water-releasing rate (%) | Number of bacteria (per gram) |
| --- | --- | --- | --- | --- | --- |
| Sample | | | | | |
| 1 | 140 | 1.00 | 140.0 | 0 | $1.4 \times 10^5$ |
| 2 | 160 | 1.15 | 184.0 | 0 | $2.2 \times 10^5$ |
| 3 | 240 | 1.35 | 324.0 | 0 | $4.8 \times 10^5$ |
| 4 | 220 | 1.23 | 270.6 | 0 | $9.8 \times 10^5$ |
| 5 | 220 | 0.90 | 198.0 | 0 | $2.8 \times 10^6$ |
| Contr. | | | | | |
| 1 | 105 | 0.70 | 73.5 | 4 | $1.3 \times 10^5$ |
| 2 | 80 | 0.65 | 52.0 | 10 | $1.1 \times 10^8$ |

As shown in the above table, the addition of ethanol and as alkaline substance to the raw material and subsequent grinding of the mixture in a vacuum brought about a great synergistic effect such that the "kamaboko" produced was pliable and had an increased jelly strength and a low or zero water-releasing rate as well as an increased resistivity to microorganisms.

The inventors also conducted the following experiment to obtain fish meat "surimi" having a higher quality and a higher caloric value.

(4) The experiment conducted to test the effect of proteolytic enzymes on the product.

1.8 kg of minced fish meat was prepared from 3.5 kg of flying fish by removing the heads and guts therefrom and separating the shin and bones by means of a separator with a mesh size of 0.3 cm. 300 g of the fish meat thus prepared was mixed with 30 g of water containing 0.1 g of "Bioplase", a proteolytic enzymatic agent having an activity of 10,000 units/g and produced by Nagase Sangyo Co., Ltd., Japan, and the mixture was kept being stirred at room temperature for one hour. Immediately after the enzymatic treatment, 6 g of table salt, 15 g of sugar, 12 g of 98.7% ethanol, 16.5 g of ice and 1.5 g of sodium carbonate were added to the enzyme-treated mixture, which was then ground for 5 minutes by the food processor installed in the vacuum desiccator set to 40 torr to produce a mass of "surimi" (Sample No. 6).

300 g of the above-mentioned fish meat was mixed with 30 g of water containing 0.1 g of "Bioplase", and the mixture was kept being stirred at room temperature for one hour. Immediately after the enzymatic treatment, 6 g of table salt, 15 g of sugar, 12 g of 98.7% ethanol and 18 g of ice were added to the treated mixture, which was then ground for 5 minutes by the food processor in the vacuum desiccator set to 40 torr to produce a mass of "surimi" (Control No. 3).

300 g of the above-mentioned fish meat was mixed with 30 g of water containing 0.1 g of "Bioplase", and the mixture was kept being stirred at room temperature for one hour. Immediately after the enzymatic treatment, 6 g of table salt, 15 g of sugar and 30 g of ice were added to the treated mixture, which was then ground for 5 minutes by the food processor installed in the vacuum desiccator set to 40 torr to produce a mass of "surimi" (Control No. 4).

300 g of the above-mentioned fish meat was mixed with 30 g of water containing 0.1 g of "Bioplase", and the mixture was kept being stirred at room temperature for one hour. Immediately after the enzymatic treatment, 6 g of table salt, 15 g of sugar and 30 g of ice were added to the mixture, which was ground by the food processor at the atmospheric pressure for 5 minutes to produce a mass of "surimi" (Control No. 5).

300 g of the above-mentioned fish meat was mixed with 6 g of table salt, 15 g of sugar, 12 g of 98.7% ethanol, 1.5 g of sodium carbonate and 46.5 g of iced water and then ground by the food processor in the desiccator set to a vacuum of 40 torr for 5 minutes to produce a mass of "surimi" (Control No. 6).

300 g of the above-mentioned fish meat was mixed with 6 g of table salt, 15 g of sugar and 60 g of iced water and ground by the food processor at the atmospheric pressure for 5 minutes to produce a mass of "surimi" (Control No. 7).

Each of Sample No. 6 and Controls No. 3 through 7 was put into tubes and heated at 90° C. for 30 minutes to produce pieces of "kamaboko". The breaking strength, compressive distance, jelly strength, water-releasing rate and number of bacteria of the products were measured. In addition, sensory tests were conducted according to a ranking method with 20 persons as panelists.

TABLE 4

| Sample or Control No. | Breaking strength (g) | Compressive distance (cm) | Jelly strength (g · cm) | Water-releasing rate (%) | Number of bacteria (per gram) | Ranking |
|---|---|---|---|---|---|---|
| 6 Contr. | 305 | 0.75 | 228.8 | 0 | $5.1 \times 10^5$ | 1 |
| 3 | 152 | 0.52 | 79.0 | 6 | $5.9 \times 10^5$ | 3 |
| 4 | 130 | 0.48 | 62.4 | 10 | $2.8 \times 10^8$ | 4 |
| 5 | 115 | 0.45 | 51.8 | 11 | $3.0 \times 10^8$ | 5 |
| 6 | 320 | 0.81 | 259.2 | 0 | $3.6 \times 10^5$ | 2 |
| 7 | 142 | 0.50 | 71.0 | 9 | $2.9 \times 10^8$ | 6 |

10 g of water was added to 10 g of each of Sample No. 6 and Controls No. 3 through No. 7 for homogenization and extraction of amino acids therefrom. Each of the mixtures was heated to remove protein residues and passed through a filter to obtain a liquid containing amino acids. Each of the liquids was analyzed by means of a liquid chromatograph for determination of amino acids contained therein. The results are shown in Table 5.

TABLE 5

| Amino Acids | Sample No. 6 | Contr. No. 3 | Contr. No. 4 | Contr. No. 5 | Contr. No. 6 | Contr. No. 7 |
|---|---|---|---|---|---|---|
| taurin | 205.1 | 201.9 | 203.2 | 202.2 | 154.8 | 156.0 |
| asparagic acid | 3.6 | 3.6 | 3.3 | 3.3 | 2.1 | 2.1 |
| threonine | 7.2 | 6.9 | 6.8 | 7.0 | 5.4 | 5.5 |
| serine | 5.6 | 5.7 | 6.1 | 5.5 | 4.0 | 4.1 |
| glutamic acid | 14.8 | 13.9 | 14.2 | 13.9 | 10.8 | 10.9 |
| glycine | 10.8 | 11.0 | 11.0 | 10.8 | 8.2 | 8.1 |
| alanine | 17.9 | 17.6 | 17.8 | 18.0 | 13.7 | 13.6 |
| valine | 4.2 | 4.1 | 4.0 | 4.0 | 3.2 | 3.3 |
| methionine | 2.2 | 2.3 | 1.9 | 2.0 | 1.6 | 1.5 |
| isoleucine | 4.2 | 4.2 | 4.2 | 4.1 | 3.3 | 3.2 |
| leucine | 5.6 | 5.5 | 5.7 | 5.5 | 4.2 | 4.1 |
| tyrosine | 5.2 | 5.1 | 5.4 | 5.5 | 3.7 | 4.0 |
| phenylalanine | 4.9 | 4.7 | 4.9 | 5.0 | 3.5 | 3.7 |
| ornithine | 3.6 | 3.6 | 3.6 | 3.6 | 2.4 | 2.7 |
| lysine | 21.3 | 21.5 | 21.0 | 21.2 | 15.9 | 16.4 |
| histidine | 178.0 | 177.7 | 175.3 | 179.0 | 130.6 | 131.3 |
| arginine | 7.8 | 7.5 | 7.8 | 7.8 | 6.8 | 6.0 |
| proline | 7.6 | 7.6 | 7.5 | 7.6 | 6.6 | 5.8 |
| Total | 509.6 | 504.4 | 504.3 | 506.0 | 380.8 | 382.3 |

(Unit: mg/100 g)

As is apparent from the above experiment, Sample No. 6 has a relatively small number of bacteria, a sufficient jelly strength, an increased degree of deliciousness due to the enzymatic treatment, and considerable amounts of free amino acids.

(5) The experiment to test the effect of treatment with lipase having a flavor-generating ability on the product.

1.8 kg of minced meat of barracoota was provided. 300 g of the fish meat was mixed with 46.5 g of water containing 0.2 g of "Talipase", an enzymatic agent having an activity of 10,000 units/g and produced by Tanabe Pharmaceutical Co., Ltd., Japan, and the mixture was kept being stirred at room temperature for one hour. Immediately after the enzymatic treatment, 6 g of table salt, 15 g of sugar, 12 g of 98.7% ethanol, and 1.5 g of sodium hyrogencarbonate were added to the enzyme-treated mixture, which was then ground for 5 minutes by the food processor installed in the vacuum desiccator set to 40 torr to produce a mass of "surimi" (Sample No. 7).

300 g of the above-mentioned fish meat was mixed with 48 g of water containing 0.2 g of "Talipase", and the mixture was kept being stirred at room temperature for one hour. Immediately after the enzymatic treatment, 6 g of table salt, 15 g of sugar and 12 g of 98.7% ethanol were added to the enzyme-treated mixture, which was then ground for 5 minutes by the food processor installed in the vacuum desiccator set to 40 torr to produce a mass of "surimi" (Control No. 8).

300 g of the above-mentioned fish meat was mixed with 60 g of water containing 0.2 g of "Talipase", and the mixture was kept being stirred at room temperature for one hour. Immediately after the enzymatic treatment, 6 g of table salt and 15 g of sugar were added to the treated mixture, which was then ground for 5 minutes by the food processor installed in the vacuum desiccator set to 40 torr to produce a mass of "surimi" (Control No. 9).

300 g of the above-mentioned fish meat was mixed with 60 g of water containing 0.2 g of "Talipase", and the mixture was kept being stirred at room temperature for one hour. Immediately after the enzymatic treatment, 6 g of table salt and 15 g of sugar were added to the treated mixture, which was then ground at the atmospheric pressure for 5 minutes to produce a mass of "surimi" (Control No. 10).

300 g of the above-mentioned fish meat was fixed with 6 g of table salt, 15 g of sugar, 12 g of 98.7% ethanol, 1.5 g of sodium hydrogencarbonate and 46.5 g of iced water, and the mixture was then ground by the food processor in the desiccator set to a vacuum of 40 torr for 5 minutes to produce a mass of "surimi" (Control No. 11).

300 g of the above-mentioned fish meat was mixed with 6 g of table salt, 15 g of sugar and 60 g of iced water and the mixture was ground by the food processor at the atmospheric pressure for 5 minutes to produce a mass of "surimi" (Control No. 12).

Each of Sample No. 7 and Controls No. 8 through 12 was put into tubes and heated at 90° C. for 30 minutes to produce pieces of "kamaboko". The breaking strength, compressive distance, jelly strength, water-releasing rate and number of bacteria of the pieces of "kamaboko" were measured. In addition, sensory tests were conducted according to the ranking method with 20 persons as panelists. The results are given in the Table 6.

TABLE 6

| Sample or Control | Breaking strength (g) | Compressive distance (cm) | Jelly strength (g · cm) | Water-releasing rate (%) | Number of bacteria (per gram) | Ranking |
|---|---|---|---|---|---|---|
| Sample 7 | 280 | 0.75 | 210.0 | 0 | $6.3 \times 10^5$ | 1 |
| Contr. 8 | 160 | 0.59 | 94.4 | 6 | $6.0 \times 10^5$ | 3 |
| Contr. 9 | 150 | 0.55 | 82.5 | 5 | $4.1 \times 10^8$ | 4 |
| Contr. 10 | 130 | 0.50 | 65.0 | 11 | $3.9 \times 10^8$ | 5 |
| Contr. 11 | 300 | 0.79 | 237.0 | 0 | $5.9 \times 10^5$ | 2 |
| Contr. 12 | 135 | 0.50 | 67.5 | 10 | $3.7 \times 10^8$ | 6 |

As is apparent from the above experiment, Sample No. 7 has a relatively small number of bacteria, a sufficient jelly strength and is deprived of fishy smell due to the lipase treatment, and as a whole is superior to the controls.

(6) The experiment to test the effect of treatment with transglutaminase (to be referred to as TG), lysyl oxidase (to be referred to as LO) and ascorbate oxidase (to be referred to as AO) which are enzymes for improving the quality of meat:

3.0 kg of minced meat of trout was provided. 300 g of the fish meat was mixed with 30 g of water containing "Activa", an enzymatic agent, produced by Ajinomoto Co., Ltd., Japan, in an amount corresponding to 900 units of TG, and the mixture was kept being stirred at room temperature for one hour. Immediately after the enzymatic treatment, 6 g of table salt, 15 g of sugar, 12 g of 98.7% ethanol, 16.5 g of ice and 1.5 g of sodium hydrogencarbonate were added to the enzyme-treated mixture, which was then ground for 5 minutes by a food processor installed in a vacuum desiccator set to 40 torr to produce a mass of "surimi" (Sample No. 8).

300 g of the above-mentioned fish meat was mixed with 30 g of water containing 900 units of TG, and the mixture was kept being stirred at room temperature for one hour. Immediately after the enzymatic treatment, 6 g of table salt, 15 g of sugar, 12 g of 98.7% ethanol and 18 g of ice were added to the treated mixture, which was then ground for 5 minutes by the food processor in the vacuum desiccator set to 40 torr to produce a mass of "surimi" (Control No. 13).

300 g of the above-mentioned fish meat was mixed with 30 g of water containing 900 units of TG, and the mixture was kept being stirred at room temperature for one hour. Immediately after the enzymatic treatment, 6 g of table salt, 15 g of sugar and 30 g of ice were added to the treated mixture, which was then ground for 5 minutes by the food processor in the vacuum desiccator set to 40 torr to produce a mass of "surimi" (Control No. 14).

300 g of the above-mentioned fish meat was mixed with 30 g of water containing 900 units of TG, and the mixture was kept being stirred at room temperature for one hour. Immediately after the enzymatic treatment, 6 g of table salt, 15 g of sugar and 30 g of ice were added to the mixture, which was then ground at the atmospheric pressure for 5 minutes to produce a mass of "surimi" (Control No. 15).

300 g of the above-mentioned fish meat was mixed with 6 g of table salt, 15 g of sugar, 12 g of 98.7% ethanol, 46.5 g of iced water and 1.5 g of sodium hydrogencarbonate, and the mixture was then ground by the food processor in the desiccator set to 40 torr for 5 minutes to produce a mass of "surimi" (Control No. 16).

300 g of the above-mentioned fish meat was mixed with 6 g of table salt, 15 g of sugar and 60 g of iced water and ground by the food processor at the atmospheric pressure for 5 minutes to produce a mass of "surimi" (Control No. 17).

300 g of the above-mentioned fish meat was mixed with 30 g of water containing an amount of a crude enzymatic agent corresponding to 500 units of LO (adjusted by the Karagan method; Biochem. J., 177, 203(1979)), and the mixture was kept being stirred at room temperature for one hour. Immediately after the enzymatic treatment, 6 g of table salt, 15 g of sugar, 12 g of 98.7% ethanol, 16.5 g of ice and 1.5 g of sodium hydrogencarbonate were added to the treated mixture, which was then ground for 5 minutes by the food processor installed in the vacuum desiccator set to 40 torr to produce a mass of "surimi" (Sample No. 9).

300 g of the above-mentioned fish meat was mixed with 30 g of water containing 500 units of LO, and the mixture was kept being stirred at room temperature for one hour. Immediately after the enzymatic treatment, 6 g of table salt, 15 g of sugar and 30 g of ice were added to the treated mixture, which was then ground for 5 minutes by the food processor at the atmospheric pressure to produce a mass of "surimi" (Control No. 18).

300 g of the above-mentioned fish meat was mixed with 30 mg of ascorbic acid and then with 30 g of water containing an enzymatic agent in an amount corresponding to 500 units of AO (produced under No. ASO-10 by Nagase Biochemical Industry Co., Ltd.), and the mixture was kept being stirred at room temperature for one hour. Immediately after the enzymatic treatment, 6 g of table salt, 15 g of sugar, 12 g of 98.7% ethanol, 16.5 g of ice and 1.5 g of sodium hydrogencarbonate were added to the treated mixture, which was then ground for 5 minutes by the food processor installed in the vacuum desiccator set to 40 torr to produce a mass of "surimi" (Sample No. 10).

300 g of the above-mentioned fish meat was mixed with 30 mg of ascorbic acid and then with 30 g of water containing 500 units of AO, and the mixture was kept being stirred at room temperature for one hour. Immediately after the enzymatic treatment, 6 g of table salt, 15 g of sugar and 30 g of ice were added to the mixture, which was ground by the food processor at the atmospheric pressure for 5 minutes to produce a mass of "surimi" (Control No. 19).

Each of Samples No. 8 through 10 and Controls No. 13 through 19 was put into tubes and heated at 90° C. for 30 minutes to produce pieces of "kamaboko". The breaking strength, compressive distance, jelly strength, water-releasing rate and number of bacteria of the pieces of "kamaboko" were measured. Table 7 shows the contents of the treatment, and Table 8 shows the results of the measurement.

TABLE 7

| Sample or Control No. | Vacuum Treat. | Ethanol Treat. | Alkali Treat. | Enzyme |
| --- | --- | --- | --- | --- |
| Sample 8 | Yes | Yes | Yes | TG |
| Contr. 13 | Yes | Yes | — | TG |
| Contr. 14 | Yes | — | — | TG |
| Contr. 15 | — | — | — | TG |
| Contr. 16 | Yes | Yes | Yes | — |
| Contr. 17 | — | — | — | — |
| Sample 9 | Yes | Yes | Yes | LO |
| Contr. 18 | — | — | — | LO |
| Sample 10 | Yes | Yes | Yes | AO |
| Contr. 19 | — | — | — | AO |

TABLE 8

| Sample or Control No. | Breaking strength (g) | Compressive distance (cm) | Jelly strength (g · cm) | Water-releasing rate (%) | Number of bacteria (per gram) |
| --- | --- | --- | --- | --- | --- |
| Sample 8 | 280 | 1.35 | 378.0 | 0 | $3.1 \times 10^5$ |
| Contr. 13 | 205 | 1.21 | 248.1 | 2.0 | $3.6 \times 10^5$ |
| Contr. 14 | 185 | 1.17 | 216.5 | 2.2 | $2.1 \times 10^8$ |
| Contr. 15 | 150 | 1.02 | 153.0 | 2.8 | $2.3 \times 10^8$ |
| Contr. 16 | 165 | 1.12 | 184.8 | 0 | $2.1 \times 10^5$ |
| Contr. 17 | 80 | 0.65 | 52.0 | 10.1 | $1.2 \times 10^8$ |
| Sample 9 | 260 | 1.29 | 335.4 | 0 | $5.6 \times 10^5$ |
| Contr. 18 | 120 | 0.99 | 118.8 | 3.2 | $4.4 \times 10^8$ |
| Sample 10 | 250 | 1.31 | 327.5 | 0 | $4.1 \times 10^5$ |
| Contr. 19 | 130 | 0.98 | 127.4 | 3.1 | $3.8 \times 10^8$ |

The experiment indicates that Sample Nos. 8 through 10 have a relatively small number of bacteria and a marked increase in the jelly strength and water-releasing rate.

From the above experiments it has been found that in the process of the invention, ethanol and an alkali act synergistically, so that the "surimi" prepared by treatment with ethanol and an alkali under a vacuum is superior in various physical properties to the "surimi" prepared by treatment with either one of the substances in the prior art methods. It has also been found that prior to the treatment with both ethanol and an alkali, previous treatment with a proteolytic enzyme, lipase, or a meat quality-improving enzyme enables preparation of "surimi" products having a high degree of pliability or flexibility, a high capacity to hold water and a high caloric value.

The method of the invention for preparing "surimi" from fish, shellfish, crustacean, poultry or animal meat (to be referred to merely as meat sometimes hereinafter) comprises providing a mass of minced meat; mixing 100 parts by weight of said minced meat with 1.0 to 6.0 parts by weight of ethanol and 0.2 to 1.0 part by weight of one or more alkaline substances selected from the group consisting of alkali metal hydroxides, alkaline earth metal hydroxides, alkali metal carbonates, alkaline earth metal carbonates, alkali metal hydrogencarbonates, alkaline earth metal hydrogencarbonates, alkali metal phosphates, alkaline earth metal phosphates, alkali metal polyphosphates, alkaline earth metal polyphosphates, alkali metal salts of organic acids, and alkaline earth metal salts of organic acids, and grinding the mixture under a vacuum below 100 torr. A mixture of two or more of said different kinds of meat may be used.

In accordance with the invention, the meat may be treated with a proteolytic enzyme selected from the group consisting of proteinases and peptidases.

Alternatively or additionally, the meat may be treated with lipase having a flavor-generating function or ability.

Alternatively or additionally, the meat may be treated with an enzyme selected from the group consisting of transglutaminase, lysyl oxidase and ascorbate oxidase.

DETAILED DESCRIPTION OF THE INVENTION

In accordance with a first embodiment of the invention, minced fish or crustacean meat, or poultry or animal meat are provided, and 100 parts by weight of the meat is mixed with 0.1 to 0.6 parts by weight of ethanol and 0.2 to 1.0 part by weight of an alkaline substance, and the mixture is ground under a vacuum below 100 torr to produce a mass of "surimi".

The amount of ethanol preferably is 2.0 to 4.0 parts by weight and the degree of vacuum preferably is below 50 torr.

The alkaline substance is selected from the group consisting of alkali metal hydroxides, alkaline earth metal hydroxides, alkali metal carbonates, alkaline earth metal carbonates, alkali metal hydrogencarbonates, alkaline earth metal hydrogencarbonates, alkali metal phosphates, alkaline earth metal phosphates, alkali metal polyphosphates, alkaline earth metal polyphosphates, alkali metal salts of organic acids, and alkaline earth metal salts of organic acids. Two or more of the alkaline substances may be used. The substance may be used in the form of a solution.

Examples of the alkaline substance are sodium hydroxide, sodium carbonate, sodium hydrogencarbonate, sodium phosphate, sodium lactate, sodium tripolyphosphate, calcium hydroxide, calcium carbonate, calcium hydrogencarbonate, calcium phosphate, calcium lactate and so on.

In accordance with the first embodiment, ethanol and an alkaline substance have a great synergistic effect on the jelly strength, water-releasing rate, flexibility and resistivity to microorganisms of the product.

In accordance with a second embodiment of the invention, part of the proteins contained in the meat are decomposed by proteolytic enzymes into various amino acids which provide for taste and flavor, and the meat thus treated is then processed in the same manner as in the first embodiment to obtain "surimi" of the meat.

The proteolytic enzyme may be selected from those enzymes which are obtained from various sources such as bacteria, molds, vegetables, plants and animals. Examples of proteinases include acrosin, urokinase, uropepsin, elastase, enteropeptidase, cathepsin, kallikrein, kininase 2, chymotrypsin, chymopapain, collagenase, streptokinase, subtilisin, thermolysin, trypsin, thrombin, papain, pancreatopeptidase, phisin, plasmin, renin, reptilase, rennin, etc.

Examples of peptidases include aminopeptidases such as arginine aminopeptidase, oxynase, leucine aminopeptidase, etc. and carboxypeptidases such as arginine carboxypeptidase, kininase 1, thyroidpeptidase, etc. Denatured forms of the above enzymes, or two or more of them may also be used.

The treatment with a proteolytic enzyme can be conducted by mixing minced meat with a solution of the enzyme in an amount 0.1 to 0.3 times the amount of the meat (the amount of the enzyme contained being 1 (one) to 10 units per gram of the meat), and grinding the mixture for about 1 (one) hour at room temperature.

In accordance with the second embodiment of the invention, it is possible to increase the amounts of amino acids in the product "surimi" as shown in Table 5 without substantially decreasing the jelly strength thereof, and to obtain a high-quality protein food material which has a high caloric value, a high degree of pliability or flexibility, and a high capacity to retain water and is less contaminated by microorganisms.

In accordance with a third embodiment of the invention, minced fish, shellfish, crustacean, poultry or animal meat is treated with lipase capable of generating flavor to decompose fat which would otherwise be oxidized or otherwise deteriorated to give offensive stink, and the treated meat is then processed according to the method of the previously described first embodiment.

Examples of the lipase having a flavor-generating ability are "Lipasesaikin" (produced by Osaka Saikin Kenkyusho, Japan), "Lipase 600" (produced by Kyowa High Foods Co., Ltd. Japan), "Talipase" (produced by Tanabe Pharmaceutical Co., Ltd., Japan), "Patalase" (produced by Novo Nordisk Bioindustry Ltd., Denmark) and "Lipase MY" (produced by Meito Sangyo Co., Ltd. , Japan).

The treatment with lipase is conducted by mixing a mass of minced meat with a solution of the enzyme in an amount 0.1 to 0.3 times the amount of the meat (the amount of the enzyme contained being 5 to 10 units per gram of the meat), and stirring the mixture at room temperature for about one hour.

In accordance with the method of the third embodiment of the invention, it is possible to produce a high-quality processed protein food material which has a milky, butter-like flavor, a high caloric value, a high degree of pliability and flexibility and a high capacity to retain water and is less contaminated by microorganisms, and from which the odor peculiar to the meat has been eliminated.

In accordance with a fourth embodiment of the invention, minced fish, shellfish, crustacean, poultry or animal meat is treated with an enzyme capable of improving the quality of meat, and then processed according to the method of the first embodiment of the invention.

The quality-improving enzyme is selected from transglutaminase (TG), lysyl oxidase (LO) and ascorbate oxidase (AO).

TG suitable for use in the process is not limited to an enzyme having a particular origin, but can be selected from those enzymes which originate from guinea pigs, plants, fish, microorganisms, those enzymes which are produced by the use of gene recombination technology, and any other enzymes which have TG-activity. In particular, the TG obtained from Streptoverticillium is preferred since it can be obtained with ease and at a low price.

LO can be any one of those obtained from natural sources or cultured bacteria provided that they catalyze oxidative deamination reaction to change the E-amino group of lysine residue and hydroxylysine residue in protein and peptide to the aldehyde group.

AO can be obtained from any suitable sources, for example, vegetables such as carrots, pumpkins and cucumbers, and microorganisms, such as Aerobacter aerokenes (Biochim, Biophye, Acta. 67 (1963) 576–580). AO obtained from cucumbers is particularly suitable for use in the process of the invention.

The treatment with TG or LO may be conducted by mixing minced meat with a solution containing the enzyme in an amount 0.1 to 0.3 times the amount of the meat (with the amount of the enzyme contained being 1 to 5 units per gram of the meat) and stirring the mixture at room temperature for about one hour.

The treatment with AO may be conducted by mixing minced meat with a solution containing the enzyme and ascorbic acid in an amount 0.1 to 0.3 times the amount of the meat (with the amount of the enzyme contained being 1 to 5 units per gram of the meat and that of ascorbic acid contained being 0.05 to 0.1 mg per gram of the meat) and stirring the mixture at room temperature for about one hour.

With the method of the fourth embodiment of the invention, it is possible to produce a high-quality protein food material which is pliable and flexible and has a high caloric value and a high capacity to retain water and is less likely to be contaminated by microorganisms due to the synergistic effect of the treatments as shown in Samples No.8 through 10.

The measurement of the TG activity may be conducted by making the enzyme catalyze the reaction between benzyloxycarbonyl-L-glutaminylglysine and hydroxylamine as substrates to produce hydroxamic acid, and forming an iron complex with the product in the presence of trichloroacetic acid, and measuring the absorbance of the complex at 525 nm thereby to determine the amount of the hydroxamic acid by use of a calibration curve.

The LO activity may be measured by the Kargan-Sillivan method (Methods in Enzymology, 82, 637(1982)).

The AO activity may be measured in the following manner; when 1 ml of 0.5 mM ascorbic acid (pH5.6) is reacted with 0.1 ml of the enzyme solution at 30° C. for 5 minutes, the amount of the enzyme to oxidize 1 $\mu$mol of ascorbic acid for 1 (one) hour is determined to be 1 (one) unit of activity of the enzyme.

DESCRIPTION OF EXAMPLES

The invention will be described further by way of the following examples.

Example 1

From 200 kg of "hokke", Atka mackerel, about 100 kg of minced fish meat was obtained by removing the heads and guts and crushing or squeezing the bodies and separating the skin and bones therefrom. 50 kg of the meat was then mixed with 1 kg of table salt, 2 kg of sugar, 3 kg of starch, 0.25 kg of sodium carbonate for use with food, 1.5 kg of 98.7% ethanol and 13.25 kg of iced water, and the mixture was ground by a ball cutter (manufactured by Yanagiya Co., Ltd., Japan) under a vacuum of 45 torr for 10 minutes to obtain a mass of "surimi". The mass was put in a plurality of tubes and heated at 90° C. for 30 minutes to obtain pieces of "kamaboko".

Comparative Example 1

1 (one) kg of table salt, 2 kg of sugar, 3 kg of starch and 15 kg of iced water were added to 50 kg of the above-mentioned minced fish meat, and the mixture was ground by the ball cutter at room temperature for 10 minutes to obtain a mass of "surimi". Pieces of "kamaboko" were produced by the same method as in Example 1.

Example 2

100 kg of chicken meat was provided, and to 50 kg of the meat was added 15.85 kg of iced water containing 1 (one) kg of table salt, 2 kg of sugar, 0.15 kg of sodium carbonate, 0.05 kg of calcium carbonate and 2 kg of 98.7% ethanol dissolved therein, and the mixture was ground by the ball cutter under a vacuum of 40 torr for 10 minutes to obtain a mass of "surimi". The mass was put in a plurality of tubes and heated at 90° C. for 30 minutes to obtain pieces of "surimi"-based food.

Comparative Example 2

1 (one) kg of table salt, 2 kg of sugar and 18 kg of iced water were added to 50 kg of the above-mentioned meat, and the mixture was ground by the ball cutter at the atmospheric pressure for 10 minutes to obtain a mass of "surimi". Pieces of "surimi"-based food were produced by the same method as in Example 2.

On the "surimi" in Examples 1 and 2 and Comparative Examples 1 and 2, measurement was conducted to determine the water-retaining rate after heating and thawing, and on the products in the above-mentioned examples measurement was conducted to determine the breaking strength, compressive distance, jelly strength, water-releasing rate and number of bacteria. The results are given in Table 9.

The water-retaining rate after heating was measured as follows: Some of the "surimi" of each of the above examples was put in a mold having a diameter of 100 mm and a depth of 10 mm. The molded mass was placed on a Teflon-coated pan heated at 140° C. to heat one surface thereof for 5 minutes and then the opposite surface thereof for another 5 minutes. The weight of the molded mass measured after the heating was divided by the weight thereof measured before the heating and the water-retaining rate after the heating was expressed by the quotient in percentage.

The water-retaining rate after thawing was measured as follows: The molded mass of "surimi" obtained in the same manner as mentioned above was stored at −20° C. for 30 days, after which the frozen mass was thawed at 5° C. The weight of the mass measured after the thawing was divided by the weight of the mass measured before it, and the water-retaining rate after the thawing was expressed by the quotient in percentage.

The breaking strength and compressive distance were measured by a rheometer manufactured by Fudoh Kogyo Co., Ltd., Japan. The jelly strength was expressed by the product of the breaking strength multiplied by the compressive distance. The water-releasing rate was expressed by the rate of change in the weight of each of the products before and after they were centrifuged at 3000 rpm for 4 minutes together with an amount of moisture-absorbing material.

The number of bacteria was counted after storage at 30° C. for two days.

TABLE 9

| Example or Comp. Ex. | Water-retaining rate After heat-ing (%) | Water-retaining rate After thaw-ing (%) | Break-ing strength (g) | Com-pressive distance (cm) | Jelly strength (g · cm) | Water-releas-ing rate (%) | Number of Bacteria (per gram) |
|---|---|---|---|---|---|---|---|
| Ex. 1 | 96.5 | 100 | 400 | 1.01 | 404.0 | 0 | $3.2 \times 10^5$ |
| Ex. 2 | 97.5 | 100 | 560 | 0.93 | 520.8 | 0 | $6.0 \times 10^5$ |
| Comp. Ex. 1 | 69.8 | 84.8 | 138 | 0.72 | 99.4 | 12.0 | $1.5 \times 10^8$ |
| Comp. Ex. 2 | 79.5 | 84.8 | 160 | 0.66 | 105.6 | 11.0 | $2.8 \times 10^8$ |

After the heating and thawing treatment, the "surimi" in Examples 1 and 2 remained stable with little or no dripping appearing thereon. In the products of Examples 1 and 2 the jelly strength increased markedly, the water-releasing rate was zero and the number of bacteria was relatively small.

With 20 persons as panelists, sensory tests were conducted on the "kamaboko" products obtained in Example 1 and Comparative Example 1 in accordance with the triangle method. All the panelists discriminated between the product of Example 1 and that of Comparative Example 1, and 19 panelists preferred the former to the latter product. Similar sensory tests were conducted on the products obtained in Example 2 and Comparative Example 2. All the panelists discriminated between the product of Example 2 and that of Comparative Example 2, and 18 panelists preferred the former to the latter product.

Example 3

600 g of minced salmon meat frozen at -20° C was provided. 300 g of the meat was put in a homogenizer placed in a vacuum desiccator set to 20 torr. The instant the homogenizer was started for rapid pulverization, an NaCl solution containing 6 g of high-quality table salt dissolved in 25 cc of water at room temperature, 15 g of sugar and 3 g of a synthetic flavoring substance were added to the meat. In addition, 9 g of 98.7% ethanol (in an amount of 3% of the protein material) and an alkaline solution containing 2.5 g of sodium hydrogencarbonate dissolved in 25 cc of water at room temperature were added, and upon lapse of 25 seconds after the start of pulverization 50 cc of water was added to the material being pulverized. The pulverization continued for 30 seconds, whereupon a pasty mass of protein food material was obtained.

Comparative Example 3

300 g of the above-mentioned salmon meat was put in the homogenizer. The instant it was started for rapid pulverization at the normal pressure, an NaCl solution of the above concentration, 15 g of sugar and 3 g of a synthetic flavoring substance were added to the meat. In addition, an alkaline solution of the above concentration was added, and in the same manner as mentioned just above a pasty mass of protein food material was obtained, as disclosed in Japanese Unexamined Patent Publication No. 7-67587.

Each of the pasty masses of Example 3 and Comparative Example 3 was put in a plurality of tubes, which were heated at 90° C. for 30 minutes to produce pieces of "kamaboko". The breaking strength, compression distance, jelly strength, water-releasing rate and number of bacteria were measured on each of the products. The results of measurement are given in Table 10.

TABLE 10

| | Breaking strength (g) | Compressive distance (cm) | Jelly strength (g · cm) | Water-releasing rate (%) | Number of bacteria (per gram) |
|---|---|---|---|---|---|
| Example 3 | 230 | 1.44 | 331.2 | 0 | $4.3 \times 10^5$ |
| Comp. Ex. 3 | 160 | 1.15 | 184.0 | 2 | $1.3 \times 12^8$ |

The product obtained in Example 3 was superior to the product obtained in Comparative Example 3 with respect to the jelly strength, water-releasing rate and number of bacteria.

Examples 4 to 14

Twelve masses of 100 parts by weight of minced salmon meat were provided, and each of the 12 masses was mixed with 2 parts by weight of table salt, 5 parts by weight of sugar, 4 parts by weight of 98.7% ethanol and 20 parts by weight of iced water. The masses, excepting one, were further mixed, respectively, with sodium hydroxide (Example 4), sodium carbonate (Example 5), sodium hydrogencarbonate (Example 6), sodium phosphate (Example 7), sodium lactate (Example 8), sodium tripolyphosphate (Example 9), calcium hydroxide (Example 10), calcium carbonate (Example 11), calcium hydrogencarbonate (Example 12), calcium phosphate (Example 13) and calcium lactate (Example 14) in an amount of 0.50 parts by weight, and the mixtures were ground under a vacuum of 50 torr for 5 minutes to produce 11 masses of "surimi" (Examples No.4 4).

Comparative Example 4

The remaining mass of 100 parts by weight of minced salmon meat was mixed with 2 parts by weight of table salt, 5 parts by weight of sugar, 4 parts by weight of 98.7% ethanol and 20 parts by weight of iced water, and the mixture was ground under a vacuum of 50 torr for 5 minutes to produce a mass of "surimi".

Each of the masses of "surimi" obtained in Examples No.4 through 14 and Comparative Example No.4 was put in tubes and heated at 90° C. for 30 minutes to produce pieces of "kamaboko". The breaking strength, compressive distance, jelly strength, water-releasing rate and number of bacteria of each of the products were measured. The results of the measurement are given in Table 11.

TABLE 11

| Example | Breaking strength (g) | Compressive distance (cm) | Jelly strength (g · cm) | Water-releasing rate (%) | Number of bacteria (per gram) |
|---|---|---|---|---|---|
| 4 | 205 | 1.28 | 262.4 | 0 | $5.0 \times 10^5$ |
| 5 | 265 | 1.39 | 368.4 | 0 | $2.3 \times 10^5$ |
| 6 | 250 | 1.41 | 352.5 | 0 | $2.1 \times 10^5$ |
| 7 | 245 | 1.42 | 347.9 | 0 | $1.9 \times 10^5$ |
| 8 | 210 | 1.30 | 273.0 | 0 | $2.0 \times 10^5$ |
| 9 | 215 | 1.40 | 301.0 | 0 | $1.8 \times 10^5$ |
| 10 | 212 | 1.30 | 275.6 | 0 | $4.1 \times 10^5$ |
| 11 | 222 | 1.32 | 293.0 | 0 | $2.3 \times 10^5$ |
| 12 | 218 | 1.30 | 283.4 | 0 | $2.1 \times 10^5$ |

TABLE 11-continued

| Example | Breaking strength (g) | Compressive distance (cm) | Jelly strength (g · cm) | Water-releasing rate (%) | Number of bacteria (per gram) |
|---|---|---|---|---|---|
| 13 | 228 | 1.31 | 298.7 | 0 | $1.8 \times 10^5$ |
| 14 | 209 | 1.29 | 269.6 | 0 | $2.3 \times 10^5$ |
| Comp. Ex. 4 | 106 | 0.71 | 75.3 | 4 | $1.3 \times 10^5$ |

In comparative Example 4, since no alkaline treatment was given, no synergistic effect was attained, so that the jelly strength was lower and the water-releasing rate was higher, than in examples 4 through 14.

Example 15

100 kg of shrimp meat was provided. 50 kg of the meat as mixed with 1 (one) kg of table salt, 2 kg of sugar, 0.15 kg of sodium carbonate, 0.05 kg of calcium phosphate, l(one) kg of 98.7% ethanol and 16.8 kg of iced water, and the mixture was ground by a ball cutter under a vacuum of 40 torr for 10 minutes to produce a mass of "surimi".

Comparative Example 5

50 kg of the shrimp meat was mixed with 1 (one) kg of table salt, 2 kg of sugar and 16.8 kg of iced water, and the mixture was ground by the ball cutter at the atmospheric pressure for 10 minutes to produce a mass of "surimi".

Measurement of the water-retaining rate was conducted on the products of Example 15 and Comparative Example 5 after the heating and thawing treatments. In Example 15 the water-retaining rate was 96.6% after the heating and 100% after the thawing. In Comparative Example 5, the water-retaining rate was 78.9% after the heating treatment and 82.3% after the thawing. The product of Example 15 remained stable with little or no appreciable dripping having been observed thereon.

Example 16

From 200 kg of "hokke", Atka mackerel, 100 kg of minced fish meat was obtained by removing the heads and guts therefrom and passing the bodies through a stamp-type meat separator. 50 kg of the minced meat was mixed with 5 kg of water containing "protease A AMANO" (produced by Amano Pharmaceutical Co., Ltd., Japan) in an amount corresponding to a proteolytic activity of 300,000 units, and the mixture was kept being stirred at room temperature for 1 (one) hour. Immediately after the enzymatic treatment, 1 (one) kg of table salt, 2 kg of sugar, 3 kg of starch, 0.2 kg of sodium hydrogencarbonate for use with food, 1.5 kg of 98.7% ethanol and 9.2 kg of ice were added to the mixture, which was ground by a ball cutter under a vacuum of 45 torr for 10 minutes to produce a mass of "surimi".

The activity of a proteolytic enzyme was measured in the following manner: In a phosphoric acid buffer (at pH 7.8) kept at 30° C. and containing casein as a substrate in an amount of 6%, an active enzymatic substance to be measured was caused to act on the casein. After any protein residue was removed by trichloroacetic acid, the substances produced by the proteolysis were colorimetrically analyzed by the use of Folin's reagent. The amount of the enzyme to produce the substances in an amount corresponding to 1 (one) µg of tyrosine in 1 (one) minute was determined to be 1(one) unit of the enzyme.

Comparative Example 6

50 kg of the above-mentioned minced fish meat was mixed with 1 (one) kg of table salt, 2 kg of sugar, 3 kg of starch and 16 kg of iced water, and the mixture was ground by the ball cutter at the atmospheric pressure for 10 minutes to produce a mass of "surimi".

From the "surimi" of each of Example 16 and Comparative Example 6, 10 pieces of fishburger were made by using molds having a diameter of 100 mm and a depth of 15 mm. The molded pieces were put on a teflon-coated flat pan heated at 140° C. to heat one surface thereof for 5 minutes and the opposite surface thereof for another 5 minutes, and the water-retaining rate after the heating treatment was measured. With 20 persons as panelists, sensory tests were also conducted according to the triangle method.

On the average the water-retaining rate was 95.2% in Example 16 and 66.1% in Comparative Example 6. In the sensory tests all the panelists discriminated between the products of Example 16 and Comparative Example 6, and evaluated that the product of Example 16 was juicy, soft and superior in flavor, taste and texture.

Example 17

100 kg of minced chicken meat was provided. 50 kg of the meat was mixed with 5 kg of water containing 200,000 units of "Flavorzyme" (produced by Novo Nordisk Bioindustry Ltd., Denmark), and the mixture was kept being stirred at room temperature for 1 (one) hour. Immediately after the enzymatic treatment, 1 (one) kg of table salt, 2 kg of sugar, 3 kg of starch, 0.2 kg of calcium carbonate for use with food, 1.5 kg of 98.7% ethanol and 9.3 kg of ice were added to the mixture, which was ground by the ball cutter set to a vacuum of 50 torr for 10 minutes to produce a mass of "surimi".

Comparative Example 7

50 kg of the above-mentioned minced chicken meat was mixed with 1 (one) kg of table salt, 2 kg of sugar, 3 kg of starch and 16 kg of iced water, and the mixture was ground by the ball cutter at the atmospheric pressure for 10 minutes to produce a mass of "surimi".

In the same manner as mentioned above with respect to Example 16 and Comparative Example 6, chickenburgers were made from the "surimi" of Example 17 and Comparative Example 7, and the water-retaining rate after the heating treatment was measured, and sensory tests were conducted according to the triangle method.

On the average the water-retaining rate was 96.2% in Example 17 and 67.7% in Comparative Example 7. In the sensory tests all the panelists discriminated between the products of Example 17 and Comparative Example 7, and evaluated that the product of Example 17 was juicy, soft and superior in flavor, taste and texture.

Example 18

600 g of frozen "surimi" of "sukesodara" (Theragra chalcogramma) was provided, and 300 g of the "surimi" was mixed with 6 g of table salt, 0.9 g of sodium glutamate, 1.5 g of "hotate" or scallop seasoning, 0.3 g of "hotate" or scallop flavor, 15 g of potato starch, 3 g of paste of boiled whole "okiami" or krill caught in the Antarctic Ocean (without proteolytic enzymatic activity), 0.06 g of "Bioplase" (10,000 units/g: produced by Nagase Bioindustry Co., Ltd.), 9 g of 98.7% ethanol and 1.5 g of sodium carbonate, and the mixture was ground by a food processor installed in a vacuum desiccator set to a vacuum of 30 torr to produce a pasty mass of the fish meat. The pasty mass was filled in a casing, and stored in a refrigerator at −10° C. for 10 hours, after which it was boiled at 95° C. for 40 minutes to produce a processed sea food, which was cut into round slices.

Comparative Example 8

In accordance with the disclosure of Japanese Unexamined Patent Publication No. 53-142561, 300 g of the above-mentioned frozen "surimi" of "sukesodara" was mixed with 6 g of table salt, 0.9 g of sodium glutamate, 1.5 g of scallop seasoning, 0.3 g of scallop flavor, 15 g of potato starch, 3 g of the paste of boiled krill and 0.06 g of "Bioplase", and the mixture was ground by the food processor installed in the vacuum desiccator set to a vacuum of 760 torr. The ground mass was further processed in the same manner as in Example 18 to obtain round slices of a processed sea food.

Measurement of the breaking strength, compressive distance, jelly strength, water-releasing rate and number of bacteria was conducted on the products of Example 18 and Comparative Example 8. Comparative sensory tests with 20 panelists were also conducted. The results of the measurement and tests are given in Table 12.

TABLE 12

| | Breaking strength (g) | Compressive distance (cm) | Jelly strength (g · cm) | Water-releasing rate (%) | Number of bacteria (per gram) | Comparison |
|---|---|---|---|---|---|---|
| Ex. 18 | 430 | 1.05 | 451 | 0 | $3.1 \times 10^5$ | 15 |
| Comp. Ex. 8 | 155 | 0.62 | 96 | 8 | $5.2 \times 10^8$ | 5 |

In the product of Example 18, no substantial reduction of the jelly strength due to the protease treatment was observed, and the water-releasing rate was zero, and the number of bacteria was relatively small. The product was superior in taste and quality. 15 members of the 20 panelists evaluated that the product of Example 18 was better than that of Comparative Example 8.

Example 19

From 200 kg of Atka mackerel, 100 kg of minced fish meat was obtained by removing the heads and guts therefrom and passing the bodies through a stamp-type meat separator. 50 kg of the minced meat was mixed with 10 kg of water containing 300,000 units of lipase (produced by Kyowa High Foods Co., Ltd., Japan), and the mixture was kept being stirred at room temperature for 1 (one) hour for enzymatic treatment. Immediately after the treatment 1(one) kg of table salt, 2 kg of sugar, 3 kg of starch, 0.2 kg of sodium carbonate for use with food, 1.5 kg of 98.7% ethanol and 4.2 kg of ice were added to the enzyme-treated mixture, which was ground by the ball cutter set to a vacuum of 45 torr for 10 minutes to produce a mass of "surimi".

The activity of lipase was measured in the following manner: A solution of a substrate (2 g of pharmacopoeial olive oil in 9 ml of M/20 acetate buffer (pH5.6) and 1 ml of M/10 $CaCl_2$) was mixed with 1 (one)ml of a diluted solution containing an enzyme to be measured in an amount of about 20 units per ml, and the mixture was kept being stirred or vibrated at 30° C. for 30 minutes for reaction, after which 40 ml of ethanol was added to the mixture to stop the enzymatic reaction. The mixture was then titrated with an N/20 NaOH solution until the pH value of the mixture became 9.5 on a pH meter, whereupon the amount of the NaOH solution spent is determined as A (ml). On the other hand, a substrate solution of the same compositon as mentioned above was mixed with 40 ml of ethanol and further with 1 (one) ml of the enzyme solution, and the mixture was titrated in the same manner as mentioned above to determine the amount of the NaOH solution as B (ml). The amount of the enzyme to separate an amount of fatty acid corresponding to 1(one) ml of the N/20 NaOH solution was determined to be 5 units, which was multiplied by the factor n of dilution to express the potency (U/ml) as: $5 \times (A-B) \times n$.

Comparative Example 9

50 kg of the above-mentioned minced meat was mixed with 1 (one) kg of table salt, 2 kg of sugar, 3 kg of starch and 16 kg of iced water, and the mixture was ground by the ball cutter at the atmospheric pressure for 10 minutes to produce a mass of "surimi".

In the same manner as mentioned above with respect to Example 16 and Comparative Example 6, fishburgers were made from the "surimi" of Example 19 and Comparative Example 9, and the water-retaining rate after the heating treatment was measured, and sensory tests were conducted according to the triangle method.

On the average the water-retaining rate was 100% in Example 19 and 65.5% in Comparative Example 9. In the sensory tests all the panelists discriminated between the products of Example 19 and Comparative Example 9, and evaluated that the product of Example 19 was juicy and soft, with butter-like flavor suitable as hamburger-like food, and was superior in flavor, taste and texture.

Example 20

100 kg of minced pork meat was provided, and 50 kg of the meat was mixed with 10 kg of water containing 500,000 units of "Talipase" (produced by Tanabe Pharmaceutical Co. Ltd., Japan), and the mixture was kept being stirred at room temperature for 1 hour for enzymatic treatment. Immediately after the treatment, 1 (one) kg of table salt, 2 kg of sugar, 0.2 kg of sodium hydrogencarbonate for use with food, 1.5 kg of 98.7% ethanol and 7.5 kg of ice were added to the mixture, which was ground by the ball cutter set to a vacuum of 40 torr for 10 minutes to produce a mass of "surimi".

Comparative Example 10

50 kg of the above-mentioned minced pork meat was mixed with 1 (one) kg of table salt, 2 kg of sugar, and 18.85 kg of iced water, and the mixture was ground by the ball cutter at the atmospheric pressure for 10 minutes to produce a mass of "surimi".

In the same manner as mentioned above with respect to Example 16 and Comparative Example 6, porkburgers were made from the "surimi" of each of Example 20 and Comparative Example 10, and the water-retaining rate after the heating treatment was measured and sensory tests were conducted according to the triangle method.

On the average the water-retaining rate was 99.6% in Example 20 and 67.2% in Comparative Example 10. In the sensory tests all the panelists discriminated between the products of Example 20 and Comparative Example 10, and evaluated that the product of Example 20 was juicy and soft, with beef-like flavor, and suitable as a substitue for hamburger.

Example 21

2 kg of mackerel was provided, and 1 (one) kg of minced mackerel meat was obtained by removing the heads and guts therefrom and passing the bodies through a stamp-type meat separator. 0.5 kg of the minced meat was mixed with 80 g of water containing 0.35 g of lipase (10,000 units/g), and the mixture was kept being stirred at room temperature for 1 (one) hour, whereupon 10 g of table salt, 25 g of sugar, 20 g of 98.7% ethanol and 2.5 g of sodium hydrogencarbonate for use with food were added to the mixture, which was ground by a food processor installed in a vacuum desiccator set to a vacuum of 40 torr for 5 minutes to produce a mass of "surimi".

Comparative Example 11

In accordance with the disclosure of Japanese Patent Publication No.54-14174, 0.5 kg of the above-mentioned minced meat was washed with water and suspended in 1.5 liters of water, to which sodium citrate was added to adjust the pH value thereof to 7.0, and 0.35 g of lipase (10,000 units/g) dissolved in a small amount of water was further added. The mixture was then kept being stirred by rotation at room temperature for 60 minutes to cause the enzyme to act on the meat, after which 3 liters of water was added to the mixture, which was further stirred and allowed to stand for a supernatant liquid to appear thereon. With the liquid having been removed, the mixture was washed with 5 liters of water six times repeatedly, and then subjected to centrifugation. The meat thus obtained was passed through a tendon remover to remove therefrom tendons, small bones and the like thereby to obtain 0.4 kg of minced meat. To the minced meat thus obtained were added 20 g of sugar and 0.8 g of sodium polyphosphate, and the mixture was ground and then subjected to rapid freezing at −40° C. for 24 hours, after which it was stored at −20° C. The frozen mass was mixed with 8 g of table salt and 80 g of iced water, and ground by a food processor at the atmospheric pressure for 5 minutes to obtain a mass of "surimi".

The "surimi" of each of Example 21 and Comparative Example 11 was filled in tubes and heated at 90° C. for 30 minutes to produce pieces of "kamaboko". Measurement of the breaking strength, compressive distance, jelly strength, water-releasing rate and number of bacteria was conducted on the products of Example 21 and Comparative Example 11. Sensory tests with 20 panelists were also conducted according to the ranking method. The results of the measurement and tests are given in Table 13.

TABLE 13

| | Breaking strength (g) | Compressive distance (cm) | Jelly strength (g · cm) | Water-releasing rate (%) | Number of bacteria (per gram) | Ranking |
|---|---|---|---|---|---|---|
| Ex. 21 | 305 | 1.15 | 351 | 0 | 7.6 × 10$^5$ | 1 |
| Comp. Ex. 11 | 211 | 0.92 | 195 | 3 | 1.2 × 10$^9$ | 2 |

The product of Example 21 was superior to that of Comparative Example 11 in the jelly strehgth, water-releasing rate and number of bacteria and was highly evaluated in the sensory tests.

Example 22

From 200 kg of bonitos, 100 kg of minced meat was obtained by removing the heads and guts therefrom and passing the bodies through a stamp-type meat separator. 50 kg of the minced meat was mixed with 5 kg of water containing 100,000 units of TG, and the mixture was kept being stirred at room temperature for 1 (one) hour for enzymatic treatment. Immediately after the treatment, 1 (one) kg of table salt, 2 kg of sugar, 3 kg of starch, 0.3 kg of calcium carbonate for use with food, 1.6 kg of 98.7% ethanol and 9.1 kg of ice were added to the mixture, which was ground by a ball cutter set to a vacuum of 50 torr for 10 minutes to produce a mass of "surimi".

Comparative Example 12

50 kg of the minced meat was mixed with 1 (one) kg of table salt, 2 kg of sugar, 3 kg of starch and 16 kg of iced water, and the mixture was ground by the ball cutter at normal pressure for 10 minutes to produce a mass of "surimi".

The "surimi" of each of Example 22 and Comparative Example 12 was filled in tubes and heated at 90° C. for 30 minutes to produce pieces of "kamaboko", on which measurement of the breaking strength, compressive distance, jelly strength, water-releasing rate and number of bacteria was conducted. The results of the measurement are given in Table 14.

TABLE 14

| | Breaking strength (g) | Compressive distance (cm) | Jelly strength (g · cm) | Water-releasing rate (%) | Number of bacteria (per gram) |
|---|---|---|---|---|---|
| Example 22 | 206 | 1.11 | 226.6 | 1.0 | 5.3 × 10$^5$ |
| Comp. Ex. 12 | 65 | 0.45 | 29.3 | — | 3.6 × 10$^8$ |

In Example 22 it was possible to make "kamaboko" from bonitos although it had been believed impossible to do so. The product of Comparative Example 12 had an extremely low jelly strength, and it was impossible to measure the water-releasing rate.

Example 23

100 kg of minced chicken meat was provided, and 50 kg of the meat was mixed with 5 kg of water containing 50,000 units of TG, and the mixture was kept being stirred at room temperature for 1 (one) hour for enzymatic treatment. Immediately after the treatment, 1 (one)kg of table salt, 2 kg of sugar, 3 kg of starch, 0.25 kg of sodium carbonate for use with food, 1.5 kg of 98.7% ethanol and 9.15 kg of ice were added to the mixture, which was ground by the ball cutter set to a vacuum of 40 torr for 10 minutes to produce a mass of "surimi".

Comparative Example 13

50 kg of the minced meat was mixed with 1 (one) kg of table salt, 2 kg of sugar, 3 kg of starch, and 16 kg of iced water, and the mixture was ground by the ball cutter at the atmospheric pressure for 10 minutes to produce a mass of "surimi".

In the same manner as mentioned above with respect to Example 16 and Comparative Example 6, chickenburgers were made from the "surimi" of each of Example 23 and Comparative Example 13, and the water-retaining rate after the heating treatment was measured and sensory tests were conducted according to the triangle method.

On the average the water-retaining rate was 100% in Example 23 and 65.6% in Comparative Example 13. In the sensory tests all the panelists discriminated between the products of Example 23 and Comparative Example 13, and evaluated that the product of Example 23 was superior.

Example 24

600 g of minced trout meat was provided. 300 g of the minced meat was mixed with 1.8 g of an enzymatic agent (90 units), and the mixture was kept being stirred at room temperature for 1 (one) hour for enzymatic treatment. Immediately after the treatment, 9 g of table salt, 15 g of sugar, 15 g of starch, 6 g of "mirin", a Japanese sweet cooking "sake", 3 g of glutamic acid, 1.5 g of sodium hydrogencarbonate for use with food, 9 g of 98.7% ethanol, and 1.41 g of iced water were added to the mixture, which was ground by a food processor installed in a vacuum desiccator set to a vacuum of 30 torr for 5 minutes to produce a mass of "surimi". The enzymatic agent was such that it had been adjusted by calcium lactate and dextrine to have a TG activity of 50 units per gram.

Comparative Example 14

In accordance with the disclosure of Japanese Unexamined Patent Publication No.6-113796, 300 g of the above-mentioned minced trout meat was mixed with 9 g of table salt and 180 g of iced water, and the mixture was kept being well stirred in the food processor, and further mixed with 15 g of starch, 15 g of sugar, 6 g of "mirin", 3 g of glutamic acid, 1.8 g of the above-mentioned enzymatic agent (90 units), and the mixture was kept being stirred until the temperature of the final product became 7° C. to produce a mass of "surimi".

The "surimi" of each of Example 24 and Comparative Example 14 was filled in tubes and heated at 90° C. for 30 minutes to produce pieces of "kamaboko", on which measurement of the breaking strength, compressive distance, jelly strength, water-releasing rate and number of bacteria was conducted. The results of the measurement are given in Table 15.

TABLE 15

| | Breaking strength (g) | Compressive distance (cm) | Jelly strength (g · cm) | Water-releasing rate (%) | Number of bacteria (per gram) |
|---|---|---|---|---|---|
| Example 24 | 205 | 1.20 | 246.0 | 0 | $2.8 \times 10^5$ |
| Comp. Ex. 14 | 95 | 0.95 | 90.3 | 4.6 | $1.6 \times 10^8$ |

As compared with the product of Comparative Example 14, the product of Example 24 had a markedly higher jelly strength, a marked lower water-releasing rate and a markedly smaller number of bacteria, and was suitable as a material for "kamaboko".

In accordance with the invention, as described above in detail, since fish, shellfish, crustacean, poultry or animal meat is treated with ethanol and alkali and ground under a vacuum to produce "surimi", it is possible due to the synergistic effect of the treating substances to make from the thus treated material a processed "surimi" food which is superior in the jelly strength, water-releasing rate, pliability or flexibility and resistivity to microorganisms.

Prior to the treatment with ethanol and alkali, by treating the meat with a proteolytic enzyme, lipase and/or an enzyme to improve the meat quality, it is possible to produce a processed "surimi" food having a higher nutritive value than otherwise.

What we claim is:

1. A process for preparing "surimi" from fish, shellfish, crustacean, poultry or animal meat, comprising:

providing a mass of minced fish, shellfish, crustacean, poultry or animal meat, or a mixture of two or more thereof;

adding to 100 parts by weight of said meat 1.0 to 6.0 parts by weight of ethanol and 0.2 to 1.0 part by weight of an alkaline substance selected from the group consisting of alkali metal hydroxides, alkaline earth metal hydroxides, alkali metal carbonates, alkaline earth metal carbonates, alkali metal hydrogencarbonates, alkaline earth metal hydrogencarbonates, alkali metal phosphates, alkaline earth metal phosphates, alkali metal polyphosphates, alkaline earth metal polyphosphates, alkali metal salts of organic acids, and alkaline earth metal salts of organic acids;

and grinding said mixture under a vacuum below 100 torr.

2. The process of claim 1, further comprising the step of treating said meat with a proteolytic enzyme selected from the group consisting of proteinases and peptidases.

3. The process of claim 1, further comprising the step of treating said meat with lipase having a flavor-generating ability.

4. The process of claim 1, further comprising the step of treating said meat with an enzyme selected from the group consisting of transglutaminase, lysyl oxidase and ascorbate oxidase.

5. An edible material comprising a mixture of 100 parts by weight of a meat selected from the group consisting of fish, shellfish, crustacean, poultry and animal meats, and a mixture of two or more of said meats; 1.0 to 6.0 parts by weight of ethanol; and 0.2 to 1.0 part by weight of an alkaline substance selected from the group consisting of alkali metal hydroxides, alkaline earth metal hydroxides, alkali metal carbonates, alkaline earth metal carbonates, alkali metal hydrogencarbonates, alkaline earth metal hydrogencarbonates, alkali metal phosphates, alkaline earth metal phosphates, alkali metal polyphosphates, alkaline earth metal polyphosphates, alkaline metal salts of organic acids, and alkaline earth metal salts of organic acids; said mixture having been ground under a vacuum below 100 torr.

6. The edible material of claim 5, wherein said meat is treated with a proteolytic enzyme selected from the group consisting of proteinases and peptidases.

7. A food product prepared from the edible material of claim 6.

8. The edible material of claim 5, wherein said meat is treated with lipase having a flavor-generating ability.

9. A food product prepared from the edible material of claim 8.

10. The edible material of claim 5, wherein said meat is treated with an enzyme selected from the group consisting of transglutaminase, lysyl oxidase and ascorbate oxidase.

11. A food product prepared from the edible material of claim 10.

12. A food product prepared from the edible material of claim 5.

* * * * *